United States Patent Office 3,484,482
Patented Dec. 16, 1969

3,484,482
PREPARATION OF HALO SUBSTITUTED
ACYL HALIDES
Louis Schmerling, Riverside, Ill., assignor to Universal
Oil Products Company, Des Plaines, Ill., a corporation
of Delaware
No Drawing. Continuation-in-part of application Ser. No.
462,059, June 7, 1965. This application Dec. 16, 1966,
Ser. No. 602,159
Int. Cl. C07c 53/00
U.S. Cl. 260—544                                    10 Claims

ABSTRACT OF THE DISCLOSURE

Halogenated acid halides are produced by reacting an olefin, carbon monoxide, carbon tetrachloride and a free radical generating compound, the improvement which is effecting the reaction in the presence of a solvent selected from the group consisting of ketones, ethers and esters.

CROSS REFERENCE TO RELATED APPLICATIONS

This application is a continuation-in-part of a copending application Ser. No. 462,059, filed June 7, 1965, now abandoned, said copending application being in turn a continuation-in-part of a copending application Ser. No. 413,613, filed Nov. 24, 1964, now abandoned.

BACKGROUND OF THE INVENTION

Ine one of its broad aspects, the present invention relates to a process for reacting an olefin, carbon monoxide and a carbon tetrahalide in the presence of a free radical generating compound at a temperature of from about 50° C. to about 30° C. and at least as high as the decomposition temperature of the free radical generating compound, and embodies the improvement which comprises effecting the reaction in a diluent selected from the group consisting of ketones, ethers and esters whereby a halogenated acid halide is recovered as an end product of the reaction.

In the parent case, hereinabove described, it was shown that while hydrocarbons in general are useful as solvents or diluents to control free radical induced reaction conditions in accordance with prior art practice, utilization of saturated hydrocarbons disclosed therein affects the course of the reaction to give an improved yield of desired products. It has now been found that ketones, ethers and esters disclosed herein can be utilized with like advantage and, in some cases, with added advantage. For example, azobisisobutyronitrile, one of the preferred free radical generating compounds, is completely soluble in an acetone-carbon tetrachloride mixture. Thus, the azobisisobutyronitrile can be prepared in solution with acetone and carbon tetrahalide and gradually charged to a reaction vessel containing ethylene, carbon monoxide and carbon tetrachloride reactants in acetone solution to effect a close control of reaction conditions. This is of course in addition to the advantage of improved yields of desired products such as are obtained with the saturated hydrocarbon diluents disclosed in the parent case.

While the prior art, as represented by U.S. Patent 2,680,763, issued to Brubaker, teaches the reaction of an olefin, carbon tetrachloride, carbon monoxide and a catalyst substantially as herein described, the art fails to recognize or teach the significance of a particular diluent with respect to the recovery of halogenated acid halides as end products of the reaction. In fact, said prior art teaches that the reaction may or may not be carried out in the presence of a diluent. The only significance attached to a diluent is that it may be employed as a reactant, for example, an alcohol or water to yield a methyl ester or carboxylic acid respectively. While benzene is disclosed as an inert solvent, benzene, not being a saturated hydrocarbon, is substantially ineffective in the recovery of halogenated acid halides as herein contemplated. That the art does not recognize nor teach the significance of a ketone, ether or ester diluent becomes apparent from the teaching of Brubaker (supra) classing said ketones, ethers and esters with carbon tetrachloride as a suitable chain transfer agent, no mention being made of their unique effect as diluents. It is of course apparent that should a compound such as a ketone, ether or ester be utilized as a chain transfer agent, the products would be other than those herein contemplated. While the prior art does refer to a halogenated acid halide, the reference is with respect to an unrecoverable intermediate (by prior art methods) and not with respect to a recoverable end product of the reaction. Thus, by the improvement of this invention halogenated acid halides are recovered as end products of the reaction and in an improved yield.

SUMMARY OF THE INVENTION

In accordance with the process of this invention halogenated acid halides are prepared by reacting carbon monoxide and a carbon tetrahalide with an olefin. Suitable olefins include ethylene, propylene and higher homologs thereof containing up to about 20 carbon atoms. Suitable olefins also include cycloolefins such as cyclopentene, cyclohexene, etc., and also bicycloalkenes like bicyclo-(2.2.1)-2-heptene and arylalkenes such as styrene, etc. Polyolefins such as butadiene and isoprene may also be utilized although not necessarily with the same or equivalent results. The preferred olefins are the 1-alkenes.

The tetrahalide reactant is preferably carbon tetrachloride, in which case the halogenated acid halide product is a trichloro acid chloride, or carbon tetrabromide, in which case the product is a tribromo acid bromide. Carbon tetrahalides containing bromine and chlorine atoms, for example bromotrichloromethane, dibromodichloromethane, and chlorotribromomethane may also be utilized. Other carbon tetrahalides comprising fluorine and/or iodine atoms, for example bromochlorodifluoromethane, dibromochlorofluoromethane, dibromodifluoromethane, dichlorobromofluoromethane, trifluoroiodomethane, trichloroiodomethane, and the like, are also operable.

Suitable free radical generating compounds include peroxy compounds containing the bivalent —O—O— radical and also azo compounds containing the bivalent —N=N— radical which decompose to form free radicals and initiate the reaction herein contemplated. Examples of such free radical generating compounds include the persulfates, perborates, and percarbonates of ammonium and of the alkali metals. Organic peroxy compounds constitute one preferred class of peroxy compounds, particularly acyl peroxides like acetyl peroxide, butyryl peroxide, lauroyl peroxide, benzoyl peroxide, diisopropylbenzoyl peroxide, etc., which, upon decomposition, form products which do not effect hydrolysis of the halogenated acid halide products of the process of this invention. Other organic peroxy compounds which can be utilized include peracetic acid, persuccinic acid, dimethyl peroxide, diethyl peroxide, diisopropyl peroxide, di-t-butyl peroxide, tetralin peroxide, urea peroxide, t-butyl perbenzoate, t-butyl hydroperoxide, methylcyclohexyl hydroperoxide, cumene hydroperoxide, methyl ethyl ketone peroxide, cyclohexanone peroxide, etc., although decomposition products of peroxides such as those last described tend to hydrolyze part of the halogenated acid halide product and such peroxides are therefore somewhat less desirable than the aforesaid acyl peroxides. Mixtures of peroxy compounds may be employed, or said peroxy compounds may be utilized in admixture with various non-aqueous diluents. Thus, commercially available organic peroxy compounds compounded with various diluents, including benzoyl peroxide composited with calcium sulfate, benzoyl peroxide compounded with camphor, etc., may be utilized. Azo compounds which contain the bivalent —N=N— radical, such as dimethyl alpha, alpha azodiisobutyrate and, particularly, azobisisobutyronitrile and its homologs, which decompose to form free radicals, constitute another preferred class of free radical generating compounds.

The present process is effected at a temperature at least as high as the initial decomposition temperature of the particular free radical generating compound employed. Free radical generating compounds decompose at a measurable rate with time in a logarithmic function dependent upon temperature. This rate of decomposition is ordinarily expressed as the half life of the free radical generating compound at a particular temperature. For example, the half life in hours for lauroyl peroxide in paraffin hydrocarbon solvent is 20.6 hours at 60° C., 5.6 hours at 70° C., and 0.76 hour at 85° C. The half life in hours for azobisisobutyronitrile is 2 hours at 80° C. and 0.1 hour at 100° C. A reaction temperature is selected at which the free radical generating compound will decompose with the generation of sufficient free radicals to initiate the condensation reaction and at which temperature the half life of said compound is such as to cause the reaction to proceed smoothly at a suitable rate. When the half life of the free radical generating compound is greater than 10 hours, radicals are not generated at a sufficient rate to cause the contemplated reaction to go forward at a satisfactory rate. Thus, the reaction temperature may be within the range of from about 50° C. to about 300° C. and at least as high as the decomposition temperature of the free radical generating compound, by which is meant a temperature such that the half life of the free radical generating compound is usually not greater than 10 hours. Since the half life for each free radical generating compound is different at different temperatures, the exact temperature to be utilized in a particular reaction will vary. However, persons skilled in the art are well acquainted with the half life vs. temperature data for different free radical generating compounds. Thus it is within the skill of one familiar with the art to select the particular temperature needed for any particular initiator. However, the operating temperature generally should not exceed the decomposition temperature of the free radical generating compound by substantially more than about 150° C. since free radical generating catalyst decompose rapidly under such high temperature conditions. For example, the half life of benzoyl peroxide is less than 10 hours at 75° C. and therefore when this peroxy compound is used, the reaction temperature is from about 75° C. to about 300° C., but generally lower than about 225° C. A reaction temperature of from about 130° C. to about 280° C. is suitable when the peroxy compound is di-t-butyl peroxide, and of from about 110° C. to about 300° C., but generally not in excess of about 260° C. with t-butyl perbenzoate. Higher reaction temperatures may be employed, but little advantage is gained if the temperature is in excess of the decomposition temperature of the free radical generating compound by more than about 150° C. as hereinbefore mentioned. The free radical generating compound can be utilized in relatively low concentration, for example, from about 0.1 to about 10 weight percent based on the weight of the tetrahalomethane reactant.

The concentration of the reactants in the reaction mixture may be varied over a relatively wide range. The carbon monoxide, being somewhat less reactive than the carbon tetrahladie reactant, is generally utilized in a molar excess thereof, usually at least about a 2 to 1 molar excess. The concentration of the olefin reactant is in conformity with the desired products. For example, when the desired products are telomers, i.e. products containing more than one olefin moiety, the olefin is utilized in a molar excess of up to about 10 to 1 or more with respect to the carbon monoxide reactant.

Although in some cases the process of this invention is operable at atmospheric pressure, it is beneficial to employ superatmospheric pressures up to about 2000 atmospheres or more. A pressure in the range of from about 10 to about 200 atmospheres is preferred.

Ketones, ethers and esters in general are useful solvents or diluents in accordance with the process of this invention provided only that they are liquid at reaction conditions. Suitable ketones thus include such as acetone, ethyl methyl ketone, diethyl ketone, methyl propyl ketone, butyl methyl ketone, cyclopentanone, cyclohexanone, acetophenone, benzophenone and the like. Suitable esters include such as methyl formate, ethyl formate, methyl acetate, ethyl acetate, n-butyl acetate, n-amyl acetate, benzyl acetate, amyl butyrate, amyl valerate, benzyl benzoate, ethyl benzoate, ethyl butyrate, ethyl cinnamate, ethyl heptoate, methyl benzoate and the like. Suitable ethers include such as methyl ether, ethyl ether, n-propyl ether, n-butyl ether, diphenyl ether, methyl phenyl ether, beta, naphthyl methyl ether and the like. The ketones, ethers and esters containing only primary and/or secondary carbon atoms are substantially inert at reaction conditions and are preferred.

In one of its more specific aspects, this invention relates to a process for reacting an olefin, carbon monoxide and carbon tetrachloride in the presence of a free radical generating compound at a temperature of from about 50° C. to about 300° C. and at least as high as the decomposition temperature of the free radical generating compound, and embodies the improvement which comprises effecting the reaction in a diluent selected from the group consisting of ketones, ethers and esters whereby a chlorinated acyl chloride is recovered as an end product of the reaction. Still more specifically, the present invention relates to a process for reacting ethylene, carbon monoxide, and carbon tetrachloride in the presence of azobisisobutyronitrile at a temperature of from about 60° C. to about 210° C. at a pressure of from about 10 to about 2000 atmospheres, and embodies the improvement which comprises effecting the reaction in an acetone diluent whereby 4,4,4-trichlorobutyryl chloride is recovered as an end product of the reaction.

The following examples are presented in illustration of certain preferred embodiments of the process of this invention and are not intended as a limitation on the generally broad scope of the invention as set out in the appended claims.

EXAMPLE I 77 grams of carbon tetrachloride, 100 grams of acetone and 2 grams of azobisisobutyronitrile were placed in a glass liner which was then inserted in a rotatable steel autoclave of 850 cubic centimeters capacity. The autoclave was flushed with dry nitrogen and sealed. Carbon monoxide was then pressured into the autoclave to bring the pressure to about 20 atmospheres and then ethylene was added to bring the total initial pressure to about 110 atmospheres at room temperature. The autoclave was rotated and heated at a temperature of 80° C. over a period of 8 hours, the maximum pressure reaching 155 atmospheres. The final pressure at room temperature was 86 atmospheres. Unreacted carbon monoxide and ethylene were discharged from the autoclave and about 199 grams of liquid product recovered from the glass liner. The liquid product was distilled at reduced pressure and 4,4,4-trichlorobutyryl chloride, 6,6,6 - trichlorohexanoyl chloride and 8,8,8-trichloro-octanoyl chloride were recovered in 12%, 7% and 8% yield, respectively, based on the carbontetrachloride charge. The identity of the products was confirmed by nuclear magnetic resonance analysis.

EXAMPLE II 53 grams of carbon tetrachloride, 102 grams of ethyl ether and 2 grams of azobisisobutyronitrile were placed in a glass liner of a rotatable steel autoclave as in Example I. The autoclave was flushed with dry nitrogen and sealed. Carbon monoxide was pressured into the autoclave to bring the pressure to about 30 atmospheres. Ethylene was then pressured into the autoclave to bring the total initial pressure to about 85 atmospheres at room temperature. The autoclave was rotated and heated to a temperature of 60 to 100° C. over about a 6 hour period, the maximum pressure reaching 102 atmospheres. The final pressure at room temperature was 55 atmospheres. Unreacted carbon monoxide and ethylene were discharged from the autoclave and the 171 grams of liquid product recovered from the glass liner. The liquid product was distilled at reduced pressure to yield about 25% 4,4,4-trichlorobutyryl chloride, 18% 6,6,6-trichlorohexanoyl chloride and 8%, 8,8,8-trichlorooctanoyl chloride.

EXAMPLE III 78 grams of carbon tetrachloride, 161 grams of ethyl propionate, and 2 grams of azobisisobutyronitrile were placed in a glass liner of a rotatable steel autoclave as in Example I. The autoclave was flushed with dry nitrogen and sealed. Carbon monoxide was then pressured into the autoclave to bring the pressure to about 30 atmospheres and thereafter ethylene was pressured into the autoclave to bring the total initial pressure to about 80 atmospheres at room temperature. The autoclave was rotated and heated to a temperature of 80° C. over a period of 8 hours, the maximum pressure reaching 102 atmospheres. The final pressure at room temperature was 60 atmospheres. Unreacted carbon monoxide and ethylene were discharged from the autoclave and the 260 grams of liquid product recovered from the glass liner. The liquid product was distilled at reduced pressure and 4,4,4-trichlorobutyryl chloride, 6,6,6-trichlorohexanoyl chloride, and 8,8,8-trichlorooctanoyl chloride were recovered in about 13%, 12% and 5% yield, respectively.

EXAMPLE IV 52 grams of carbon tetrachloride, 102 grams of ethyl ether, and 5 grams of benzoyl peroxide are placed in a glass liner of a rotatable steel autoclave as in Example I. The autoclave is flushed with dry nitrogen, sealed and carbon monoxide pressured into the autoclave to bring the pressure to about 40 atmospheres. Thereafter, ethylene is added to bring the total initial pressure to 75 atmospheres at room temperature. The autoclave is rotated and heated to a temperature of about 80° C. over a 5 hour period. Thereafter, the autoclave is cooled to about room temperature and unreacted carbon monoxide and ethylene discharged therefrom and the liquid product recovered from the glass liner. The liquid product is distilled at reduced pressure and the 4,4,4-trichlorobutyryl chloride fraction recovered.

EXAMPLE V 77 grams of carbon tetrachloride, 100 grams of acetone, 2 grams of azobisisobutyronitrile, and 100 grams of cyclopentene are placed in a glass liner and inserted in a rotatable steel autoclave. The autoclave is flushed with dry nitrogen and sealed. Carbon monoxide is pressured into the autoclave to bring the pressure to about 60 atmospheres. The autoclave is rotated and heated to a temperature of 80 to 110° C. over a 5 hour period. The autoclave is cooled to about room temperature and unreacted carbon monoxide discharged therefrom. The liquid product is distilled at reduced pressure to yield the 2-(trichloromethyl)cyclopentanecarbonyl chloride.

EXAMPLE VI 100 grams of carbon tetrachloride, 100 grams of ethyl ether and 4 grams of azobisisobutyronitrile are placed in a glass liner of a rotatable steel autoclave as in Example I. The autoclave is flushed with dry nitrogen, sealed and 100 milliliters of propylene pressured into the autoclave. Carbon monoxide is then pressured in to bring the pressure to 50 atmospheres. The autoclave is then rotated at a temperature of 60 to 100° C. over a 5 hour period. The unreacted carbon monoxide and propylene are discharged from the autoclave and the liquid product recovered from the liner and distilled under reduced pressure to recover a 4,4,4-trichloro-2-methylbutyryl chloride fraction.

I claim as my invention:

1. In the process of reacting an olefin, carbon monoxide and a carbon tetrahalide in the presence of a free radical generating compound at a temperature of from about 50° C. to about 300° C. and at least as high as the decomposition temperature of the free radical generating compound, the improvement which comprises effecting the reaction in a diluent selected from the group consisting of ketones, ethers and esters whereby a halogenated acid halide is recovered as an end product of the reaction.

2. The process of claim 1 further characterized in that said olefin is an alkene.

3. The process of claim 2 further characterized in that said carbon tetrahalide is carbon tetrachloride and said halogenated acid halide is a chlorinated acid chloride.

4. The process of claim 3 further characterized in that said alkene is ethylene, and further characterized in that said free radical generating compound is azobisisobutyronitrile, said temperature being from about 60° to about 210° C.

5. The process of claim 4 further characterized in that said diluent is a ketone.

6. The process of claim 4 further characterized in that said diluent is an ether.

7. The process of claim 4 further characterized in that said diluent is an ester.

8. The process of claim 5 further characterized in that said ketone is acetone.

9. The process of claim 6 further characterized in that said ether is ethyl ether.

10. The process of claim 7 further characterized in that said ester is ethyl propionate.

References Cited

UNITED STATES PATENTS 2,680,763    6/1954    Brubaker _____ 260—544

OTHER REFERENCES

Walling: "Free Radicals in Solution," (1957), pp. 150–155.

LORRAINE A. WEINBERGER, Primary Examiner

EDWARD J. GLEIMAN, Assistant Examiner